(12) United States Patent
Zhu et al.

(10) Patent No.: US 12,341,730 B2
(45) Date of Patent: Jun. 24, 2025

(54) FLEXIBLE TIME DIVISION DUPLEXING CONFIGURATION

(71) Applicant: QUALCOMM Incorporated, San Diego, CA (US)

(72) Inventors: Xipeng Zhu, San Diego, CA (US); Luis Fernando Brisson Lopes, Swindon (GB); Ozcan Ozturk, San Diego, CA (US); Huilin Xu, Temecula, CA (US); Peng Cheng, Beijing (CN); Kazuki Takeda, Tokyo (JP)

(73) Assignee: QUALCOMM Incorporated, San Diego, CA (US)

( * ) Notice: Subject to any disclaimer, the term of this patent is extended or adjusted under 35 U.S.C. 154(b) by 231 days.

(21) Appl. No.: 17/904,770

(22) PCT Filed: Apr. 9, 2021

(86) PCT No.: PCT/CN2021/086152
§ 371 (c)(1),
(2) Date: Aug. 22, 2022

(87) PCT Pub. No.: WO2021/204240
PCT Pub. Date: Oct. 14, 2021

(65) Prior Publication Data
US 2023/0040309 A1  Feb. 9, 2023

(30) Foreign Application Priority Data
Apr. 9, 2020  (WO) .......................... CN2020083860

(51) Int. Cl.
*H04W 72/0446* (2023.01)
*H04L 5/14* (2006.01)

(52) U.S. Cl.
CPC ....... *H04L 5/1469* (2013.01); *H04W 72/0446* (2013.01)

(58) Field of Classification Search
None
See application file for complete search history.

(56) References Cited

U.S. PATENT DOCUMENTS 10,660,090 B2   5/2020  Lee et al.
2019/0089583 A1  3/2019  Islam et al.
(Continued)

FOREIGN PATENT DOCUMENTS

EP   3567789 A1   11/2019
EP   3606243 A1   2/2020
(Continued)

OTHER PUBLICATIONS

3GPP: "3rd Generation Partnership Project, Technical Specification Group Radio Access Network, NG-RAN, F1 application protocol (F1AP) ( Release 16)", DRAFT_38473-G00, 3rd Generation Partnership Project, Mobile Competence Centre, 650, Route Des Lucioles, F-06921 Sophia-Antipolis Cedex, France, 3GPP TS 38.473 V16.0.0, Dec. 2019, pp. 1-239, Jan. 2, 2020, XP052366467, section: 8.2.3.2, p. 19, line 6—p. 20, line 6, section: 9.3.1.89, p. 127, line 32—p. 128, line 44.
(Continued)

*Primary Examiner* — Minh Trang T Nguyen
(74) *Attorney, Agent, or Firm* — Harrity & Harrity, LLP

(57) ABSTRACT

Various aspects of the present disclosure generally relate to wireless communication. In some aspects, a base station may select, from a plurality of slot formats for supporting time division duplexing, a slot format for use during time division duplexing; transmit an information element that includes a half-slot slot-type to identify the slot format for use during time division duplexing; and communicate with a user equipment (UE) in a time division duplexing mode in accordance with the slot format. Numerous other aspects are provided.

30 Claims, 9 Drawing Sheets

600 ⟶

610 — Transmit an information element identifying a slot format pattern for use during time division duplexing, wherein a length of a parameter of the information element satisfies a threshold that is based at least in part on a periodicity of the slot format pattern 620 — Communicate with a UE or BS in a TDD mode in accordance with the slot format pattern

(56) References Cited

U.S. PATENT DOCUMENTS

| | | | |
|---|---|---|---|
| 2019/0149365 A1 | 5/2019 | Chatterjee et al. | |
| 2019/0174487 A1 | 6/2019 | Sun et al. | |
| 2019/0349180 A1 | 11/2019 | Lu et al. | |
| 2020/0053728 A1* | 2/2020 | Huang | H04L 27/26025 |
| 2020/0099501 A1 | 3/2020 | Jia et al. | |

FOREIGN PATENT DOCUMENTS

| | | |
|---|---|---|
| WO | 2019005660 | 1/2019 |
| WO | 2019028369 A1 | 2/2019 |
| WO | 2019052495 A1 | 3/2019 |
| WO | WO-2019100338 A1 | 5/2019 |
| WO | WO-2019234285 A1 | 12/2019 |
| WO | WO-2020027615 A1 | 2/2020 |
| WO | WO-2020030555 A1 | 2/2020 |

OTHER PUBLICATIONS

Supplementary European Search Report—EP21784705—Search Authority—The Hague—Mar. 11, 2024.

Huawei, et al., "DL Channels and Signals in NR Unlicensed Band," 3GPP TSG RAN WG1 Meeting #96bis, R1-1903926, Apr. 8-12, 2019, 11 pages.

Huawei, et al., "Remaining Details on Group-Common PDCCH", 3GPP Draft; R1-1715396, 3rd Generation Partnership Project (3GPP), Mobile Competence Centre; 650, Route Des Lucioles, F-06921 Sophia-Antipolis Cedex, France, vol. RAN WG1, No. Nagoya, Japan; Sep. 18, 2017-Sep. 21, 2017, Sep. 9, 2017 (Sep. 9, 2017), XP051328960, 6 Pages, Retrieved from the Internet: URL:http://www.3gpp.org/ftp/tsg_ran/WG1_RL1/TSGR1_AH/NR_AH_1709/Docs/ [retrieved on Sep. 9, 2017], Method of Dynamic Slot Configuration for URLLC Using Slot Format Determination/SFI; Definition of Flexible Symbols and Transmission Direction;Paragraph [0001]—Paragraph [0002].

International Search Report and Written Opinion—PCT/CN2021/086152—ISA/EPO—Jul. 7, 2021.

International Search Report and Written Opinion—PCT/CN2020/083860—ISA/EPO—Dec. 30, 2020.

Nokia, et al., "Feature Lead's Summary on Channel Access Procedures", 3GPP TSG RAN WG1 Meeting #99, R1-1912258, Nov. 22, 2019 (Nov. 22, 2019), 25 Pages, the whole document.

NTT Docomo, Inc., "DL Signals and Channels for NR-U," 3GPP TSG RAN WG1 #98bis, R1-1911158, Oct. 14-20, 2019 (Oct. 20, 2019), section 3, pp. 1-11.

* cited by examiner

FLEXIBLE TIME DIVISION DUPLEXING CONFIGURATION

CROSS-REFERENCE TO RELATED APPLICATIONS

This Patent Application is the 371 National Phase of PCT Application No. PCT/CN2021/086152, filed Apr. 9, 2021, entitled "FLEXIBLE TIME DIVISION DUPLEXING CONFIGURATION," which claims priority to PCT Patent Application No. PCT/CN2020/083860, filed on Apr. 9, 2020, entitled "FLEXIBLE TIME DIVISION DUPLEXING CONFIGURATION," and assigned to the assignee hereof. The disclosure of the prior Applications are considered part of and [is] are incorporated by reference into this Patent Application.

FIELD OF THE DISCLOSURE

Aspects of the present disclosure generally relate to wireless communication and to techniques and apparatuses for flexible time division duplexing (TDD) configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a base station (BS) includes selecting, from a plurality of slot formats for supporting time division duplexing, a slot format for use during time division duplexing; transmitting an information element that includes a half-slot slot-type to identify the slot format for use during time division duplexing; and communicating with a user equipment (UE) in a time division duplexing mode in accordance with the slot format.

In some aspects, a method of wireless communication performed by a UE includes receiving an information element that includes a half-slot or full-slot slot-type to identify a slot format, of a plurality of slot formats for supporting time division duplexing, for use during time division duplexing; selecting the slot format for use during time division duplexing based at least in part on whether the information element includes the half-slot or full-slot slot-type to identify the slot format; and communicating with a BS in a time division duplexing mode in accordance with the slot format.

In some aspects, a BS for wireless communication includes a memory; and one or more processors, coupled to the memory, configured to: select, from a plurality of slot formats for supporting time division duplexing, a slot format for use during time division duplexing; transmit an information element that includes a half-slot slot-type to identify the slot format for use during time division duplexing; and communicate with a UE in a time division duplexing mode in accordance with the slot format.

In some aspects, a UE for wireless communication includes a memory; and one or more processors, coupled to the memory, configured to: receive an information element that includes a half-slot or full-slot slot-type to identify a slot format, of a plurality of slot formats for supporting time division duplexing, for use during time division duplexing; select the slot format for use during time division duplexing based at least in part on whether the information element includes the half-slot or full-slot slot-type to identify the slot format; and communicate with a BS in a time division duplexing mode in accordance with the slot format.

In some aspects, a non-transitory computer-readable medium stores a set of instructions for wireless communication includes one or more instructions that, when executed by one or more processors of a BS, cause the BS to: select, from a plurality of slot formats for supporting time division duplexing, a slot format for use during time division duplexing; transmit an information element that includes a half-slot slot-type to identify the slot format for use during time division duplexing; and communicate with a UE in a time division duplexing mode in accordance with the slot format.

In some aspects, a non-transitory computer-readable medium stores a set of instructions for wireless communication includes one or more instructions that, when executed by one or more processors of an UE, cause the UE to: receive an information element that includes a half-slot or full-slot slot-type to identify a slot format, of a plurality of slot formats for supporting time division duplexing, for use during time division duplexing; select the slot format for use during time division duplexing based at least in part on whether the information element includes the half-slot or full-slot slot-type to identify the slot format; and communicate with a BS in a time division duplexing mode in accordance with the slot format.

In some aspects, an apparatus for wireless communication includes means for selecting, from a plurality of slot formats for supporting time division duplexing, a slot format for use during time division duplexing; means for transmitting an information element that includes a half-slot slot-type to identify the slot format for use during time division duplexing; and means for communicating with a UE in a time division duplexing mode in accordance with the slot format.

In some aspects, an apparatus for wireless communication includes means for receiving an information element that includes a half-slot or full-slot slot-type to identify a slot format, of a plurality of slot formats for supporting time division duplexing, for use during time division duplexing; means for selecting the slot format for use during time division duplexing based at least in part on whether the information element includes the half-slot or full-slot slot-type to identify the slot format; and means for communicating with a BS in a time division duplexing mode in accordance with the slot format.

In some aspects, a method of wireless communication performed by a BS includes transmitting an information element identifying a slot format pattern for use during time division duplexing, wherein a length of, or indicated by, a parameter of the information element satisfies a threshold that is based at least in part on a periodicity of the slot format pattern; and communicating with a UE in a time division duplexing (TDD) mode in accordance with the slot format pattern.

In some aspects, a method of wireless communication performed by a BS includes receiving an information element identifying a slot format pattern for use during time division duplexing, wherein a length of, or indicated by, a parameter of the information element satisfies a threshold that is based at least in part on a periodicity of the slot format pattern; and communicating with a UE or BS in a TDD mode in accordance with the slot format pattern.

In some aspects, a BS for wireless communication includes memory; and one or more processors, coupled to the memory, configured to: transmit an information element identifying a slot format pattern for use during time division duplexing, wherein a length of, or indicated by, a parameter of the information element satisfies a threshold that is based at least in part on a periodicity of the slot format pattern; and communicate with a UE in a TDD mode in accordance with the slot format pattern.

In some aspects, a BS for wireless communication includes memory; and one or more processors, coupled to the memory, configured to: receive an information element identifying a slot format pattern for use during time division duplexing, wherein a length of, or indicated by, a parameter of the information element satisfies a threshold that is based at least in part on a periodicity of the slot format pattern; and communicate with a UE or BS in a TDD mode in accordance with the slot format pattern.

In some aspects, a non-transitory computer-readable medium stores a set of instructions for wireless communication includes one or more instructions that, when executed by one or more processors of a BS, cause the BS to: transmit an information element identifying a slot format pattern for use during time division duplexing, wherein a length of, or indicated by, a parameter of the information element satisfies a threshold that is based at least in part on a periodicity of the slot format pattern; and communicate with a UE in a TDD mode in accordance with the slot format pattern.

In some aspects, a non-transitory computer-readable medium stores a set of instructions for wireless communication includes one or more instructions that, when executed by one or more processors of an BS, cause the BS to: receive an information element identifying a slot format pattern for use during time division duplexing, wherein a length of, or indicated by, a parameter of the information element satisfies a threshold that is based at least in part on a periodicity of the slot format pattern; and communicate with a UE or BS in a TDD mode in accordance with the slot format pattern.

In some aspects, an apparatus for wireless communication includes means for transmitting an information element identifying a slot format pattern for use during time division duplexing, wherein a length of, or indicated by, a parameter of the information element satisfies a threshold that is based at least in part on a periodicity of the slot format pattern; and means for communicating with a UE in a TDD mode in accordance with the slot format pattern.

In some aspects, an apparatus for wireless communication includes means for receiving an information element identifying a slot format pattern for use during time division duplexing, wherein a length of, or indicated by, a parameter of the information element satisfies a threshold that is based at least in part on a periodicity of the slot format pattern; and means for communicating with a UE or BS in a TDD mode in accordance with the slot format pattern.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, RF chains, power amplifiers, modulators, buffer, processor(s), interleaver, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
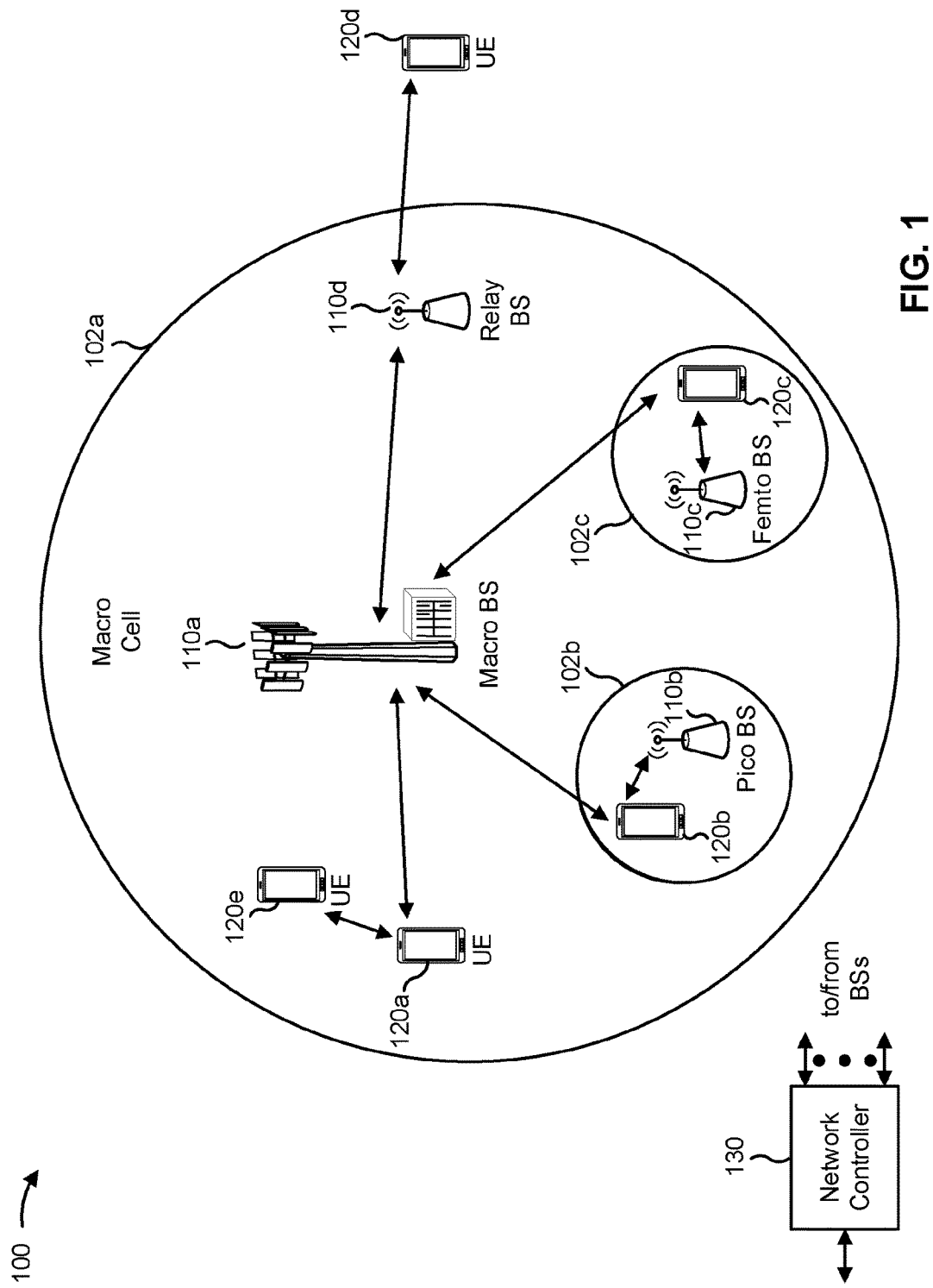
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an "NR BS", a "Node B", a "gNB", a "5G node B (NB)", "an access point", a "transmit receive point" ("TRP"), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
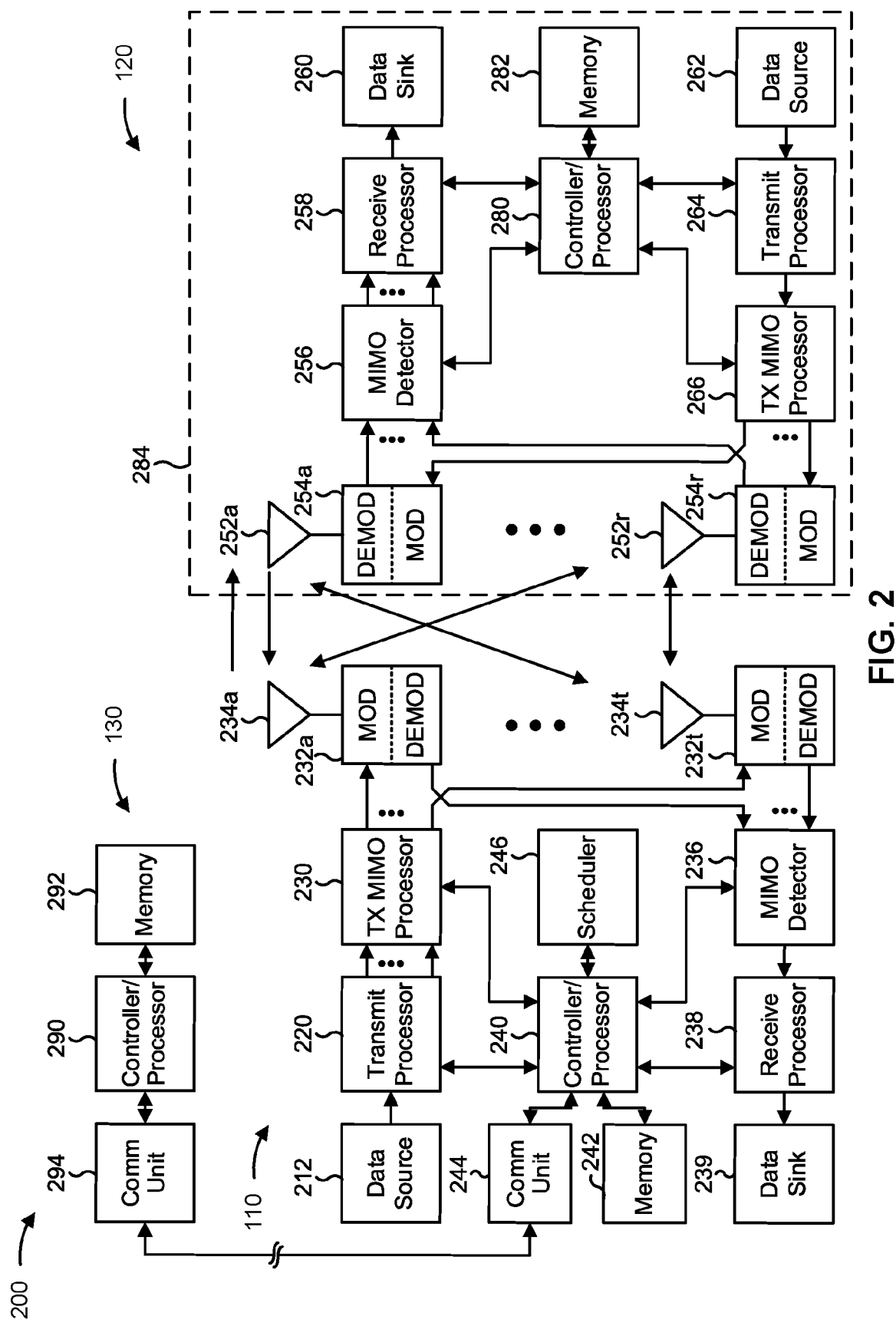
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODS) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-7.

Controller/processor 240 of base station 110, controller/processor 280 of UE 120, and/or any other component(s) of FIG. 2 may perform one or more techniques associated with flexible time division duplexing (TDD) configuration, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 400 of FIG. 4, process 500 of FIG. 5, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, a BS includes means for selecting, from a plurality of slot formats for supporting time division duplexing, a slot format for use during time division duplexing; means for transmitting an information element that includes a half-slot slot-type to identify the slot format for use during time division duplexing; or means for communicating with a UE in a time division duplexing mode in accordance with the slot format. The means for the BS to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, a UE includes means for receiving an information element that includes a half-slot or full-slot slot-type to identify a slot format, of a plurality of slot formats for supporting time division duplexing, for use during time division duplexing; means for selecting the slot format for use during time division duplexing based at least in part on whether the information element includes the half-slot or full-slot slot-type to identify the slot format; or means for communicating with a BS in a time division duplexing mode in accordance with the slot format. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, a BS includes means for transmitting an information element identifying a slot format pattern for use during time division duplexing, wherein a length of, or indicated by, a parameter of the information element satisfies a threshold that is based at least in part on a periodicity of the slot format pattern; or means for communicating with a UE in a TDD mode in accordance with the slot format pattern. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

In some aspects, the BS includes means for receiving an information element identifying a slot format pattern for use during time division duplexing, wherein a length of, or indicated by, a parameter of the information element satisfies a threshold that is based at least in part on a periodicity of the slot format pattern; or means for communicating with a UE or BS in a TDD mode in accordance with the slot format pattern. The means for the base station to perform operations described herein may include, for example, one or more of transmit processor 220, TX MIMO processor 230, modulator 232, antenna 234, demodulator 232, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

In some communications systems, a plurality of different TDD uplink (UL) downlink (DL) (UL-DL) configurations may be possible. Each TDD UL-DL configuration may have an associated set of slot formats for a plurality of symbols during a communication cycle. For example, symbols may be assigned as downlink symbols (D), uplink symbols (U), flexible symbols (F), and/or the like, as shown in Third Generation Partnership Project (3GPP) Technical Specification (TS) 38.213 Table 11.1.1-1 Slot Formats For Normal Cyclic Prefix. In this case, the slot format table includes an all downlink symbol format (Format 0), an all uplink symbol format (Format 1), and an all flexible symbol format (Format 2). Formats 3 through 55 include different combinations of at least one flexible symbol and one or more uplink symbols and/or downlink symbols.

During communication configuration, a BS may transmit an information element (IE), such as an "Intended TDD DL-UL Configuration NR" information element to establish a slot format for communications. The defined information element may support enumeration of slot formats 0-45 of the aforementioned slot format table. However, the defined information element does not support indication of slot formats 46-55. For example, slot formats 46-53 and 55 include a plurality of DL-UL direction switches, which may result in the information element including insufficient bits to indicate the slot format. Moreover, slot format 54 neither starts with a downlink symbol nor ends with an uplink symbol (slot format 54 starts with a flexible symbol and ends with a downlink symbol), which may necessitate a greater quantity of bits to identify than are available in the defined information element. Furthermore, other possible slot formats may be defined for a communication system, which may not be identifiable using the defined information element. By restricting a set of slot formats that may be configured for a communication system, a flexibility to adapt to network traffic conditions is restricted, thereby reducing network efficiency, network performance, and/or the like.

Some aspects described herein provide for flexible TDD configuration. For example, a BS may transmit an information element that includes slot format configuration information for either a full-slot slot-type or a half-slot slot-type. In this case, the UE may interpret the information element to be either identifying a full-slot slot-type or a half-slot slot-type and may identify the slot format based at least in part on whether the information element identifies a full-slot slot-type or a half-slot slot-type. In this case, based at least in part on enabling the information element to convey information for a half-slot rather than a full-slot, the BS and the UE enable the information element to identify each slot format of the aforementioned slot format table, as well as other possible slot formats to provide additional flexibility to network communications. Moreover, although some aspects are described in terms of a BS communicating with a UE, the BS may provide the information element to another BS, to a node in a hierarchical network, and/or the like, thereby providing flexibility for TDD configuration in other types of deployments.

Figure 3:
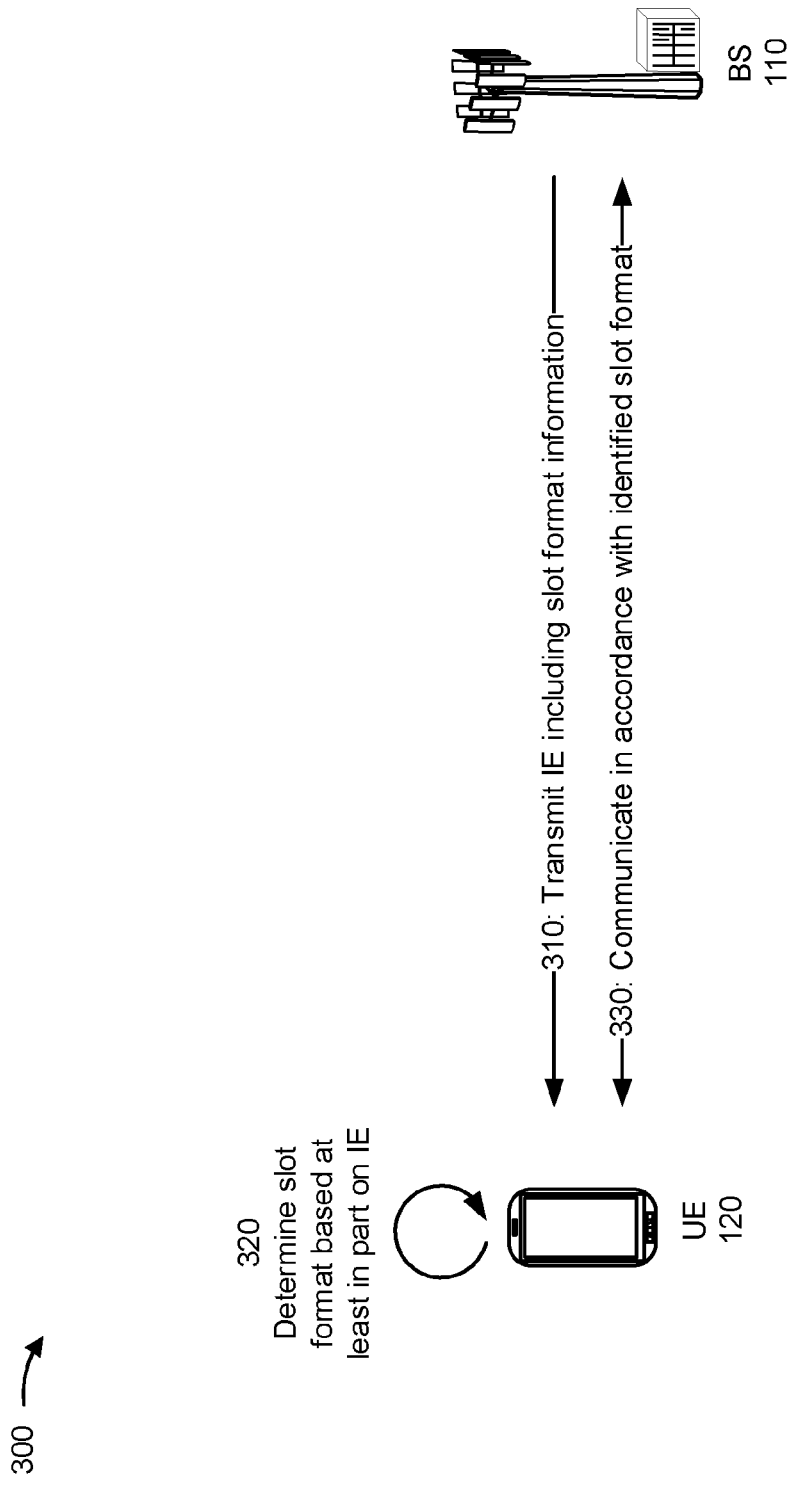
FIG. 3 is a diagram illustrating an example of flexible time division duplexing (TDD) configuration, in accordance with the present disclosure.

FIG. 3 is a diagram illustrating an example 300 of flexible TDD configuration, in accordance with various aspects of the present disclosure. As shown in FIG. 3, example 300 includes a BS 110 and a UE 120.

As further shown in FIG. 3, and by reference number 310, BS 110 may transmit an information element to UE 120. For example, BS 110 may determine a slot format that UE 120 is to use for communication and may transmit an information element to convey information identifying the slot format. In some aspects, BS 110 may transmit the information element to UE 120 to identify the slot format. For example, when BS 110 is in direct communication with UE 120, BS 110 may transmit the information element to UE 120 to enable UE 120 to determine the slot format. Additionally, or alternatively, BS 110 may transmit the information element to another BS 110, a child node (e.g., in an integrated access and backhauling (IAB) deployment), and/or the like. For example, BS 110 may transmit the information element on an Xn application protocol (AP) interface, an F1-AP interface, and/or the like. Additionally, or alternatively, BS 110 may transmit the information element using radio resource control (RRC) signaling, system information block (SIB) signaling, and/or the like.

In some aspects, BS 110 may be associated with a plurality of cells, a plurality of distributed units (DUs) each with one or more cells, and/or the like. For example, BS 110 may be a central unit (CU) with a plurality of DUs, and each DU may have a plurality of cells. In this case, BS 110 may indicate a TDD UL-DL configuration at a node level (e.g., a DU level or at a cell level) by including information identifying the slot format (e.g., the information element) in a configuration message. For example, BS 110 may provide information identifying the slot format in an Xn-AP configuration update message, an Xn-AP configuration update acknowledgement message, an Xn setup request message, an Xn setup response message, and/or the like. Additionally, or alternatively, BS 110 may provide the information identifying the slot format in an F1-AP CU configuration update message, an F1-AP DU configuration update message, and/or the like. In some aspects, BS 110 may identify the slot format on for a particular frequency carrier.

In some aspects, BS 110 may transmit the information element with a particular slot-type for identifying the slot format. For example, BS 110 may transmit the information element with a half-slot slot-type, which may enable BS 110 to identify a plurality of different slot formats, such as each slot format of the aforementioned slot format table. Additionally, or alternatively, BS 110 may transmit the information element with a full-slot slot-type, which may enable identification of a subset of slot formats of the plurality of different slot formats. Additionally, or alternatively, BS 110 may transmit the information element with the full-slot slot-type to provide backwards compatibility with some UEs 120 that are not configured for using an information element with a half-slot slot-type in the information element.

As further shown in FIG. 3, and by reference number 320, UE 120 may determine a slot format based at least in part on the information element. For example, UE 120 may interpret the information element to identify a slot format identified by the information element. In some aspects, UE 120 may determine whether the information element includes a full-slot slot-type or a half-slot slot-type. For example, UE 120 may determine whether the information element includes the full-slot slot-type or the half-slot slot-type based at least in part on a subcarrier spacing (SCS), a transmission periodicity, a length of, or indicated by, a slot configuration list, and/or the like. In this case, UE 120 may determine whether (SCS/15 kilohertz (kHz))*NR DL-UL Transmission Periodicity parameter is equal to the length of a slot configuration list (the information element includes a full-slot slot-type) or is less than the length of the slot configuration list (the information element includes a half-slot slot-type). In this case, based at least in part on whether the information element includes the full-slot slot-type or the half-slot slot-type, UE 120 may determine which slot format UE 120 is to use to communicate with BS 110.

In some aspects, the length of, or indicated by, the slot configuration list identifying a slot format pattern may be extended to support additional TDD UL-DL transmission periodicities. For example, BS 110 may transmit an information element with an extended slot configuration list to support transmission periodicities of between 10 milliseconds (ms) and 160 ms. In this case, a maximum quantity of slots may be extended to 5120 from a maximum quantity of slots of 320 that is used for 10 ms periodicities. This may improve network performance relative to other maximum lengths of a slot configuration list. For example, in some communications systems, a maximumnoofslots parameter may be set to 320, which may support full flexibility for a 10 ms UL-DL transmission periodicity. However, by setting the parameter, maximumnoofslots, to 5120, full flexibility may be achieved for a 160 ms UL-DL transmission periodicity.

As further shown in FIG. 3, and by reference number 330, UE 120 may communicate with BS 110 in accordance with the identified slot format. For example, UE 120 may transmit on an uplink during an uplink symbol or a flexible symbol, receive on a downlink during a downlink symbol or a flexible symbol, and/or the like.

As indicated above, FIG. 3 is provided as an example. Other examples may differ from what is described with respect to FIG. 3.

Figure 4:
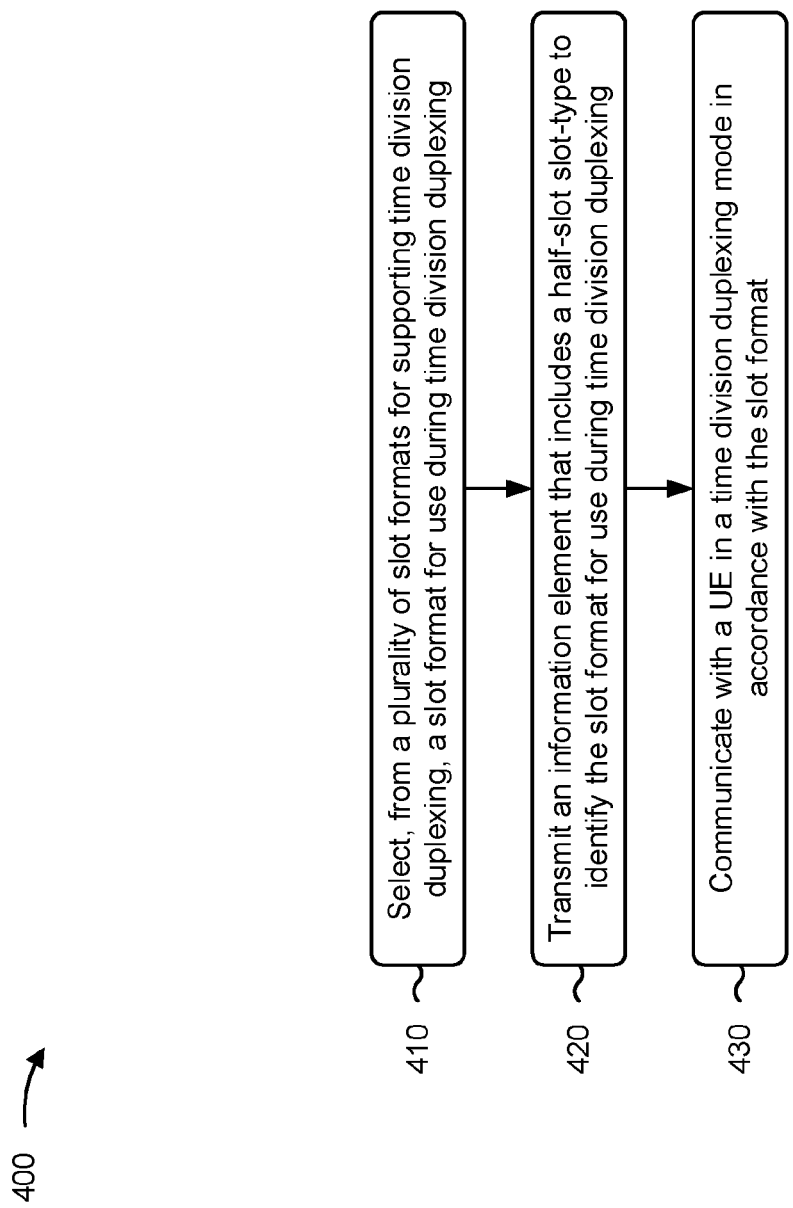
FIGS. 4-7 are diagrams illustrating example processes associated with flexible TDD configuration, in accordance with the present disclosure.

FIG. 4 is a diagram illustrating an example process 400 performed, for example, by a BS or another network element, in accordance with various aspects of the present disclosure. Example process 400 is an example where the BS (e.g., BS 110 and/or the like) performs operations associated with flexible TDD configuration.

As shown in FIG. 4, in some aspects, process 400 may include selecting, from a plurality of slot formats for supporting time division duplexing, a slot format for use during time division duplexing (block 410). For example, the BS (e.g., using transmit processor 220, receive processor 238, controller/processor 240, memory 242, and/or the like) may select, from a plurality of slot formats for supporting time division duplexing, a slot format for use during time division duplexing, as described above.

As further shown in FIG. 4, in some aspects, process 400 may include transmitting an information element that includes a half-slot slot-type to identify the slot format for use during time division duplexing (block 420). For example, the BS (e.g., using transmit processor 220, receive processor 238, controller/processor 240, memory 242, and/or the like) may transmit an information element that includes a half-slot slot-type to identify the slot format for use during time division duplexing, as described above.

As further shown in FIG. 4, in some aspects, process 400 may include communicating with a UE in a time division duplexing mode in accordance with the slot format (block 430). For example, the BS (e.g., using transmit processor 220, receive processor 238, controller/processor 240, memory 242, and/or the like) may communicate with a UE in a time division duplexing mode in accordance with the slot format, as described above.

Process 400 may include additional aspects, such as any single aspect or any combination of aspects described below and/or in connection with one or more other processes described elsewhere herein.

In a first aspect, a maximum number of slots in a slot configuration list of the information element includes a threshold quantity of slots associated with a set of periodicities of the plurality of slot formats.

In a second aspect, alone or in combination with the first aspect, the information element is an Xn-AP or F1-AP information element.

In a third aspect, alone or in combination with one or more of the first and second aspects, the information element is a radio resource control information element.

In a fourth aspect, alone or in combination with one or more of the first through third aspects, the slot format is indicated, in the information element, at a node level or a cell level.

In a fifth aspect, alone or in combination with one or more of the first through fourth aspects, the information element is included in at least one of a configuration update message, a configuration update acknowledgement message, a setup request message, or a setup response message.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
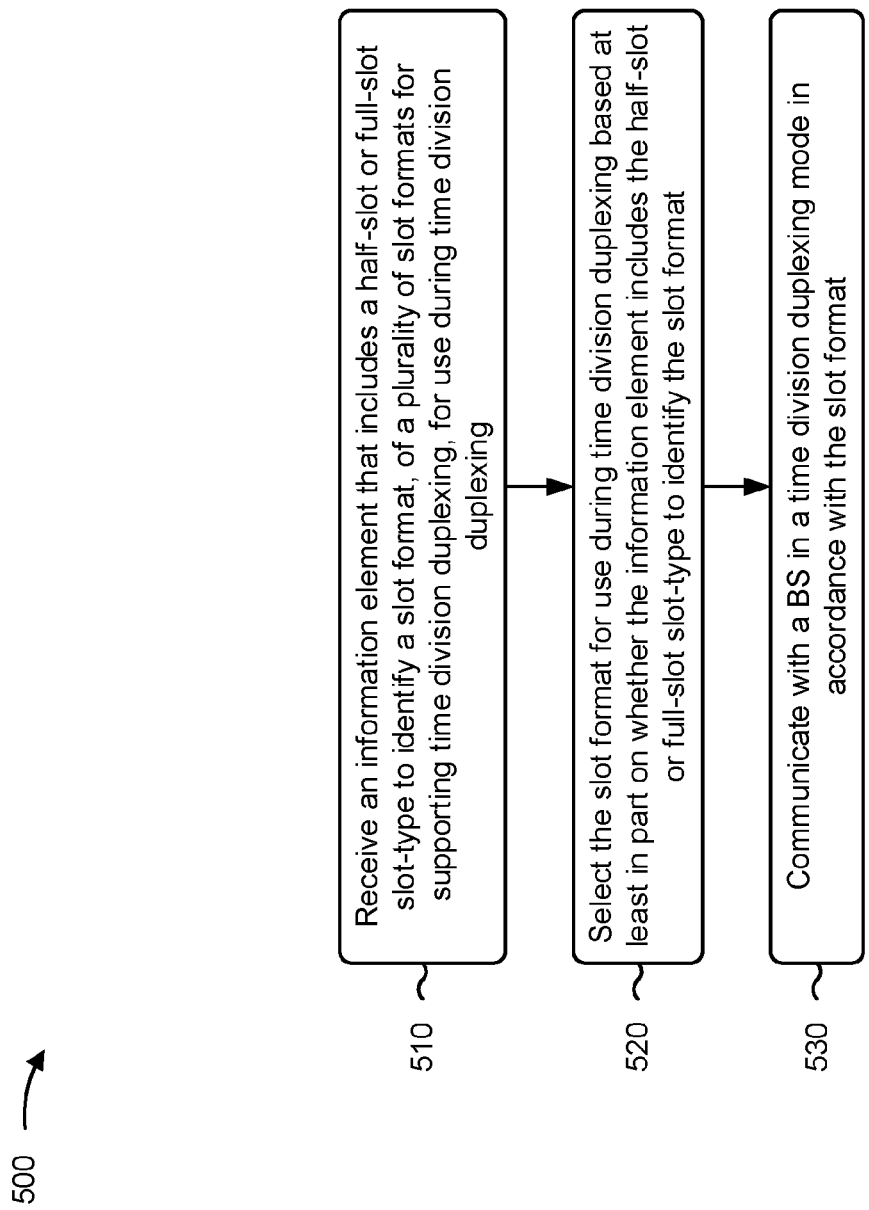

FIG. 5 is a diagram illustrating an example process 500 performed, for example, by a UE, in accordance with various aspects of the present disclosure. Example process 500 is an example where the UE (e.g., UE 120 and/or the like) performs operations associated with flexible time division duplexing configuration.

As shown in FIG. 5, in some aspects, process 500 may include receiving an information element that includes a half-slot or full-slot slot-type to identify a slot format, of a plurality of slot formats for supporting time division duplexing, for use during time division duplexing (block 510). For example, the UE (e.g., using receive processor 258, transmit processor 264, controller/processor 280, memory 282, and/or the like) may receive an information element that includes a half-slot or full-slot slot-type to identify a slot format, of a plurality of slot formats for supporting time division duplexing, for use during time division duplexing, as described above.

As further shown in FIG. 5, in some aspects, process 500 may include selecting the slot format for use during time division duplexing based at least in part on whether the information element includes the half-slot or full-slot slot-type to identify the slot format (block 520). For example, the UE (e.g., using receive processor 258, transmit processor 264, controller/processor 280, memory 282, and/or the like) may select the slot format for use during time division duplexing based at least in part on whether the information element includes the half-slot or full-slot slot-type to identify the slot format, as described above.

As further shown in FIG. 5, in some aspects, process 500 may include communicating with a BS in a time division duplexing mode in accordance with the slot format (block 530). For example, the UE (e.g., using receive processor 258, transmit processor 264, controller/processor 280, memory 282, and/or the like) may communicate with a BS in a time division duplexing mode in accordance with the slot format, as described above.

Process 500 may include additional aspects, such as any single aspect or any combination of aspects described below and/or in connection with one or more other processes described elsewhere herein.

In a first aspect, process 500 includes determining the information element includes the half-slot or full-slot slot-type to identify the slot format based at least in part on at least one of a length of, or indicated by, a slot configuration list of the information element, a subcarrier spacing, or a transmission periodicity.

In a second aspect, alone or in combination with the first aspect, a maximum number of slots in a slot configuration list of the information element includes a threshold quantity of slots associated with a set of periodicities of the plurality of slot formats.

In a third aspect, alone or in combination with one or more of the first and second aspects, the information element is an Xn AP or F1-AP information element.

In a fourth aspect, alone or in combination with one or more of the first through third aspects, the information element is a radio resource control information element.

In a fifth aspect, alone or in combination with one or more of the first through fourth aspects, the slot format is indicated, in the information element, at a node level or a cell level.

In a sixth aspect, alone or in combination with one or more of the first through fifth aspects, the information element is included in at least one of a configuration update message, a configuration update acknowledgement message, a setup request message, or a setup response message.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
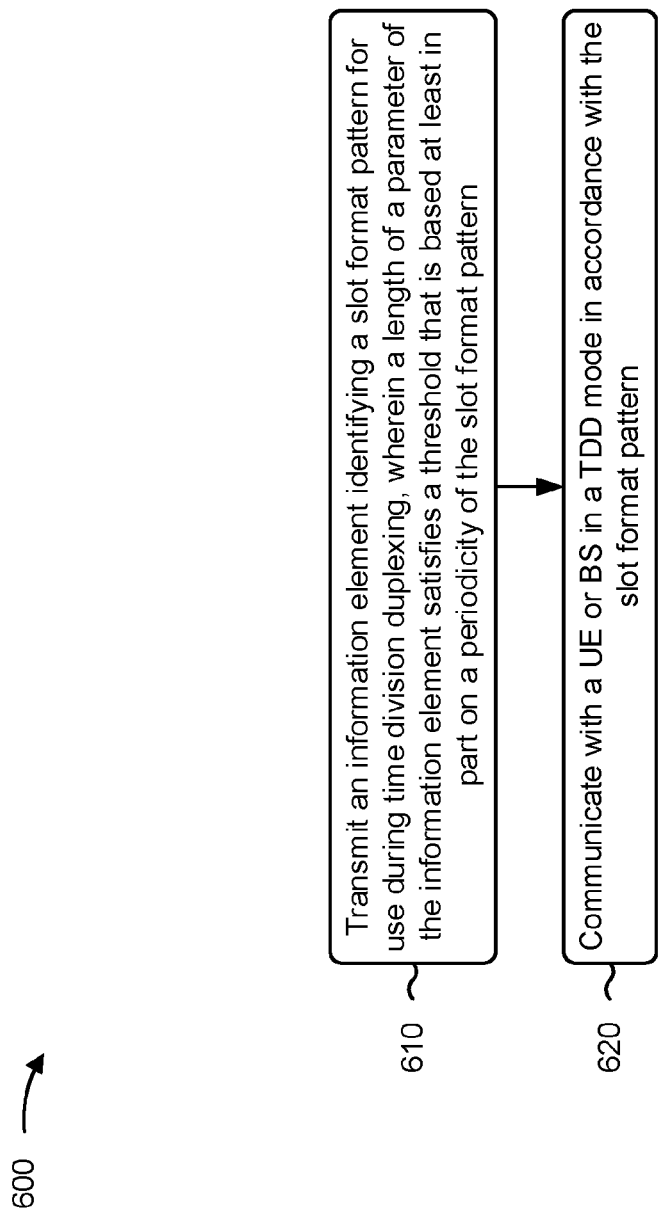

FIG. 6 is a diagram illustrating an example process 600 performed, for example, by a BS or another network element, in accordance with the present disclosure. Example process 600 is an example where the BS (e.g., BS 110) performs operations associated with flexible time division duplexing configuration.

As shown in FIG. 6, in some aspects, process 600 may include transmitting an information element identifying a slot format pattern for use during time division duplexing, wherein a length of, or indicated by, a parameter of the information element satisfies a threshold that is based at least in part on a periodicity of the slot format pattern (block 610). For example, the BS (e.g., using transmission component 804, depicted in FIG. 8) may transmit an information element identifying a slot format pattern for use during time division duplexing, wherein a length of, or indicated by, a parameter of the information element satisfies a threshold that is based at least in part on a periodicity of the slot format pattern, as described above. In some aspects, the BS may select a slot format pattern for use during TDD based at least in part on whether the information element includes a half-slot or full-slot slot-type to identify the slot format pattern.

As further shown in FIG. 6, in some aspects, process 600 may include communicating with a UE or BS (or another network element) in a TDD mode in accordance with the slot format pattern (block 620). For example, the BS (e.g., using reception component 802 and/or transmission component 804, depicted in FIG. 8) may communicate with a UE in a TDD mode in accordance with the slot format pattern, as described above.

Process 600 may include additional aspects, such as any single aspect or any combination of aspects described below and/or in connection with one or more other processes described elsewhere herein.

In a first aspect, the periodicity is a 160 millisecond TDD UL/DL periodicity.

In a second aspect, alone or in combination with the first aspect, the length of the parameter or indicated by the parameter is up to 5120.

In a third aspect, alone or in combination with one or more of the first and second aspects, the parameter is a slot configuration list length.

In a fourth aspect, alone or in combination with one or more of the first through third aspects, the parameter is a maximum number of slots parameter.

In a fifth aspect, alone or in combination with one or more of the first through fourth aspects, the information element is an Xn-AP or F1-AP information element.

In a sixth aspect, alone or in combination with one or more of the first through fifth aspects, the information element is a radio resource control information element.

In a seventh aspect, alone or in combination with one or more of the first through sixth aspects, the slot format pattern is indicated, in the information element, at a node level or a cell level.

In an eighth aspect, alone or in combination with one or more of the first through seventh aspects, the information element is included in at least one of a configuration update message, a configuration update acknowledgement message, a setup request message, or a setup response message.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
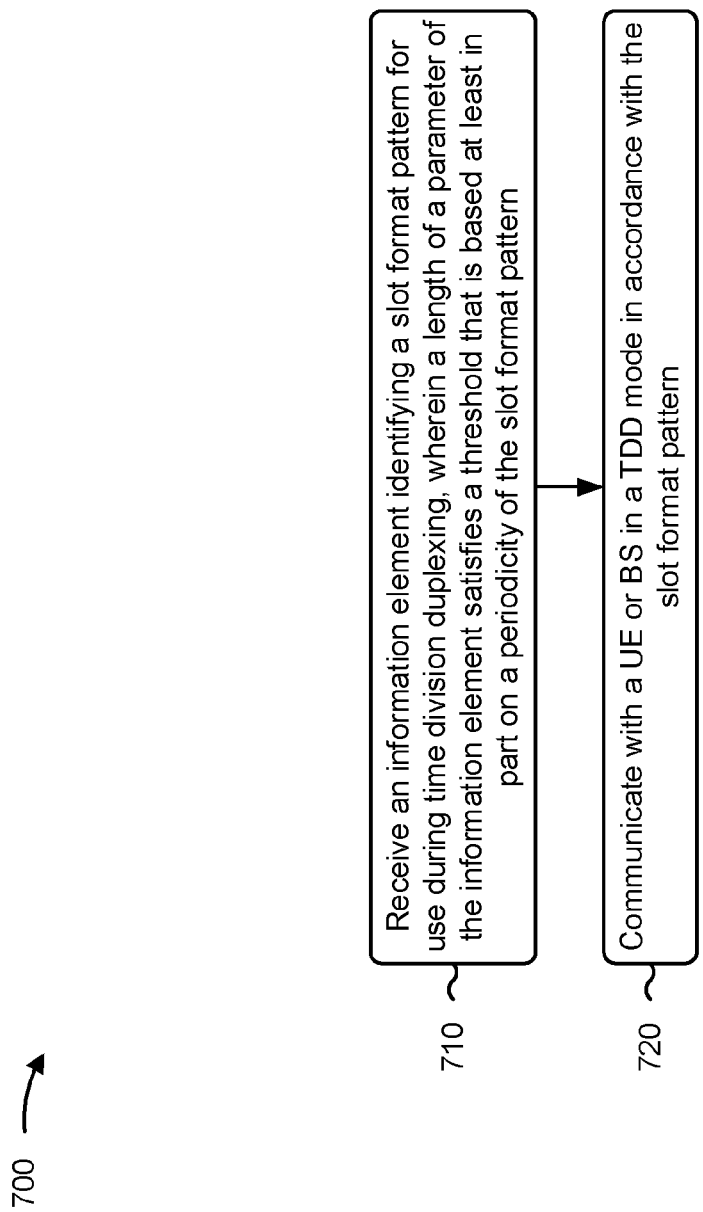

FIG. 7 is a diagram illustrating an example process 700 performed, for example, by a BS or another network element, in accordance with the present disclosure. Example process 700 is an example where the BS (e.g., BS 110) performs operations associated with flexible time division duplexing configuration.

As shown in FIG. 7, in some aspects, process 700 may include receiving an information element identifying a slot format pattern for use during time division duplexing, wherein a length of, or indicated by, a parameter of the information element satisfies a threshold that is based at least in part on a periodicity of the slot format pattern (block 710). For example, the BS (e.g., using reception component 802, depicted in FIG. 8) may receive an information element identifying a slot format pattern for use during time division duplexing, wherein a length, or indicated by, of a parameter of the information element satisfies a threshold that is based at least in part on a periodicity of the slot format pattern, as described above. In some aspects, the BS may select a slot format pattern for use during TDD based at least in part on whether the information element includes a half-slot or full-slot slot-type to identify the slot format pattern.

As further shown in FIG. 7, in some aspects, process 700 may include communicating with a UE or BS (or another network element) in a TDD mode in accordance with the slot format pattern (block 720). For example, the BS (e.g., using reception component 802 and/or transmission component 804, depicted in FIG. 8) may communicate with a UE in a TDD mode in accordance with the slot format pattern, as described above.

Process 700 may include additional aspects, such as any single aspect or any combination of aspects described below and/or in connection with one or more other processes described elsewhere herein.

In a first aspect, the periodicity is a 160 ms TDD UL/DL periodicity.

In a second aspect, alone or in combination with the first aspect, the length of the parameter or indicated by the parameter is up to 5120.

In a third aspect, alone or in combination with one or more of the first and second aspects, the parameter is a slot configuration list length.

In a fourth aspect, alone or in combination with one or more of the first through third aspects, the parameter is a maximum number of slots parameter.

In a fifth aspect, alone or in combination with one or more of the first through fourth aspects, the information element is included in at least one of a configuration update message, a configuration update acknowledgement message, a setup request message, or a setup response message.

In a sixth aspect, alone or in combination with one or more of the first through fifth aspects, the information element is an Xn AP or F1-AP information element.

In a seventh aspect, alone or in combination with one or more of the first through sixth aspects, the information element is a radio resource control information element.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
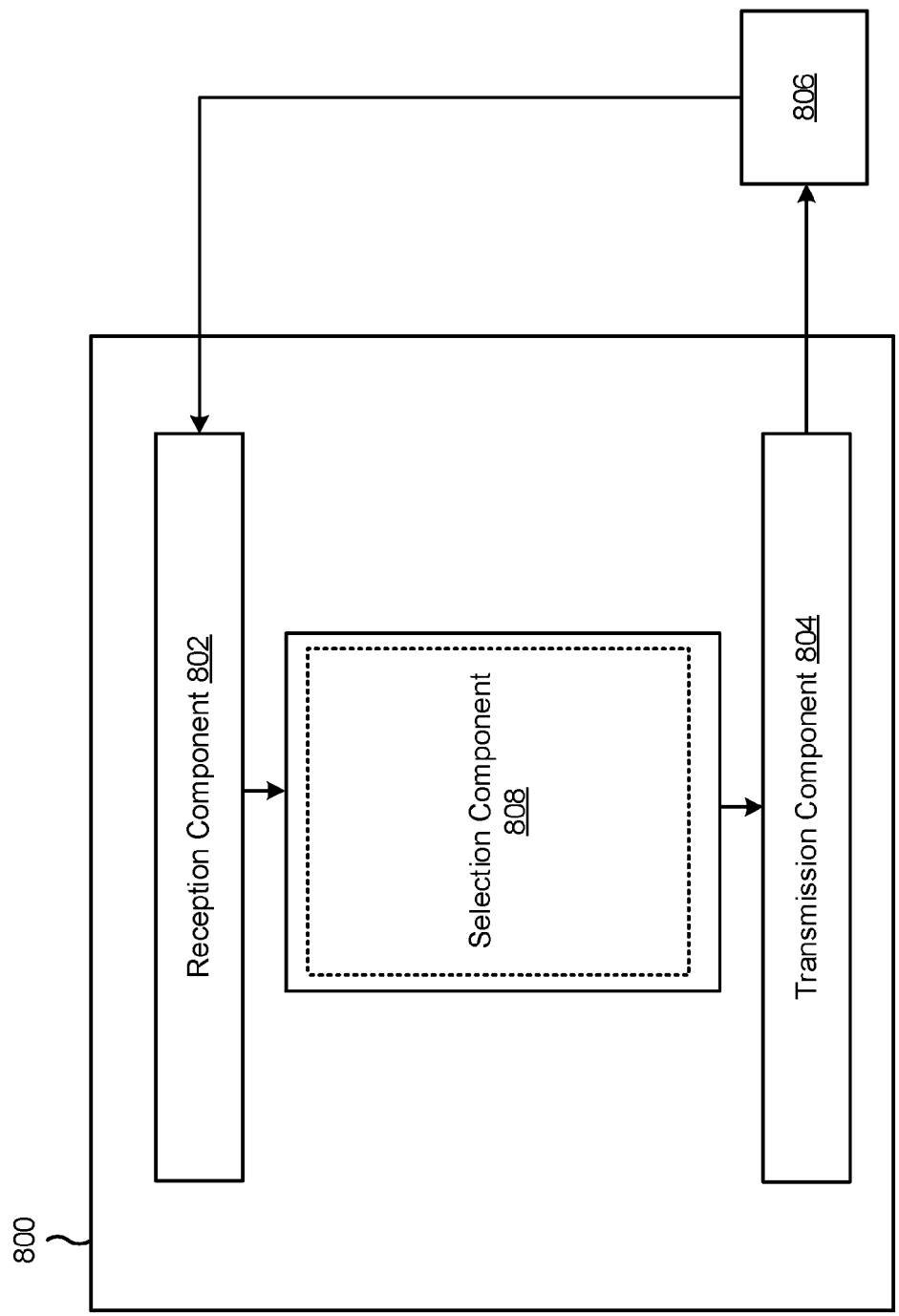
FIGS. 8-9 are block diagrams of example apparatuses for wireless communication, in accordance with the present disclosure.

FIG. 8 is a block diagram of an example apparatus 800 for wireless communication. The apparatus 800 may be a BS, or a BS may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a selection component 808, among other examples.

In some aspects, the apparatus 800 may be configured to perform one or more operations described herein in connection with FIG. 3. Additionally, or alternatively, the apparatus 800 may be configured to perform one or more processes described herein, such as process 400 of FIG. 4, process 600 of FIG. 6, process 700 of FIG. 7, or a combination thereof. In some aspects, the apparatus 800 and/or one or more components shown in FIG. 8 may include one or more components of the BS described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the BS described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the BS described above in connection with FIG. 2. In some aspects, the transmission component 804 may be co-located with the reception component 802 in a transceiver.

The selection component 808 may select, from a plurality of slot format patterns for supporting time division duplexing, a slot format for use during time division duplexing. The transmission component 804 may transmit an information element that includes a half-slot slot-type to identify the slot format for use during time division duplexing. The reception component 802 and/or the transmission component 804 may communicate with a UE, such as the apparatus 806, in a TDD mode in accordance with the slot format. The transmission component 804 may transmit an information element identifying a slot format pattern for use during time division duplexing, wherein a length of, or indicated by, a parameter of the information element satisfies a threshold that is based at least in part on a periodicity of the slot format pattern. The reception component may receive an information element identifying a slot format pattern for use during time division duplexing.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
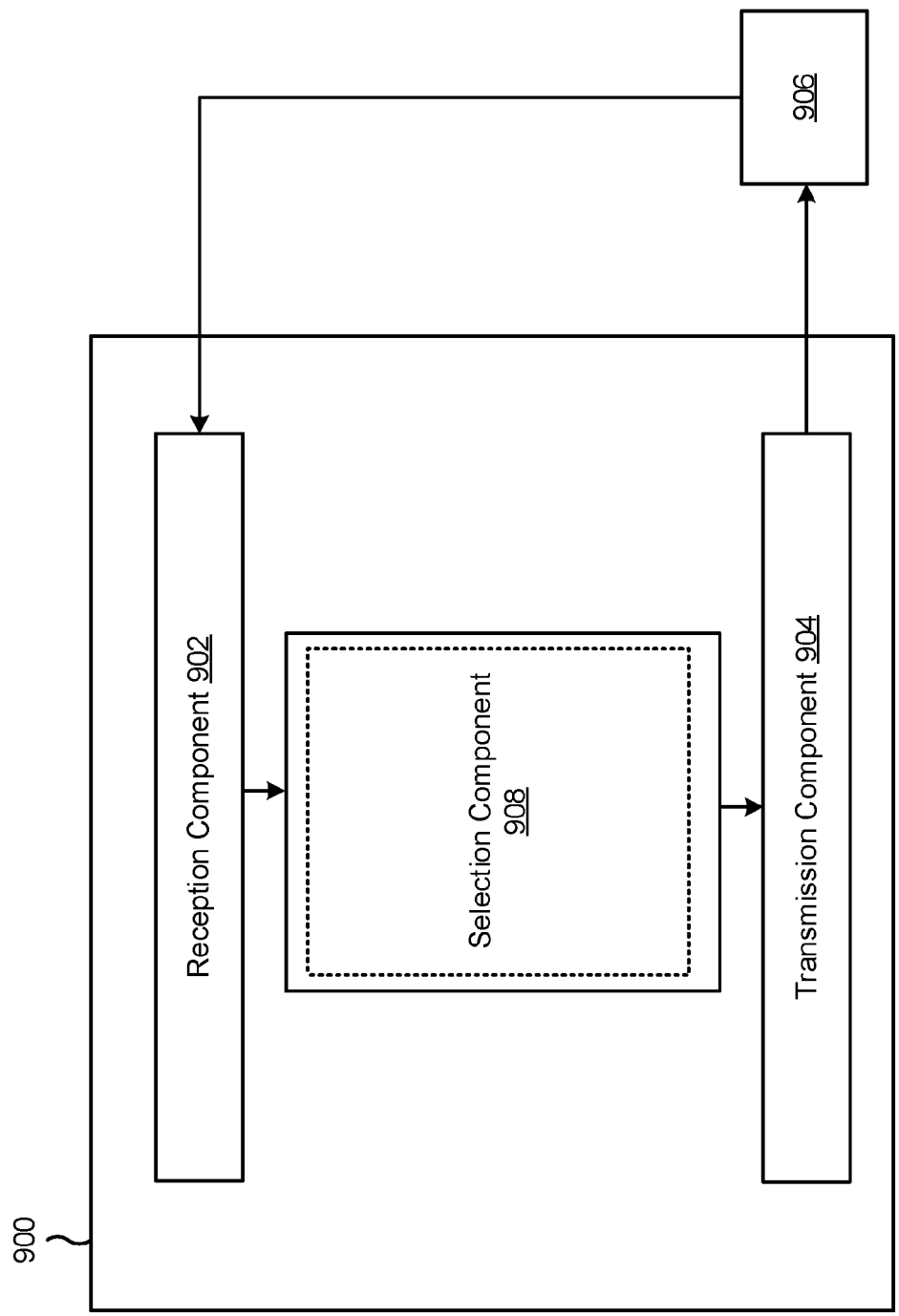

FIG. 9 is a block diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a selection component 908, among other examples.

In some aspects, the apparatus 900 may be configured to perform one or more operations described herein in connection with FIG. 3. Additionally, or alternatively, the apparatus 900 may be configured to perform one or more processes described herein, such as process 500 of FIG. 5. In some aspects, the apparatus 900 and/or one or more components shown in FIG. 9 may include one or more components of the UE described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 906. In some aspects, the reception component 902 may include one or more antennas, a demodulator, a MIMO detector, a receive processor, a controller/processor, a memory, or a combination thereof, of the UE described above in connection with FIG. 2.

The transmission component 904 may transmit communications, such as reference signals, control information, data communications, or a combination thereof, to the apparatus 906. In some aspects, one or more other components of the apparatus 906 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the UE described above in connection with FIG. 2. In some aspects, the transmission component 904 may be co-located with the reception component 902 in a transceiver.

The reception component 902 may receive an information element that includes a half-slot or full-slot slot-type to identify a slot format, of a plurality of slot formats for supporting time division duplexing, for use during time division duplexing. The selection component 908 may select the slot format for use during time division duplexing based at least in part on whether the information element includes the half-slot or full-slot slot-type to identify the slot format. The reception component 902 and/or the transmission component 904 may communicate with a base station in a time division duplexing mode in accordance with the slot format. The selection component 908 may determine the information element includes the half-slot or full-slot slot-type to identify the slot format based at least in part on at least one of a length of, or indicated by, a slot configuration list of the information element, a subcarrier spacing, or a transmission periodicity. The reception component 902 may receive an information element identifying a slot format for use during time division duplexing, wherein a length of, or indicated by, a parameter of the information element satisfies a threshold that is based at least in part on a periodicity of the slot format.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a base station (BS), comprising: selecting, from a plurality of slot formats for supporting time division duplexing, a slot format for use during time division duplexing; transmitting an information element that includes a half-slot slot-type to identify the slot format for use during time division duplexing; and communicating with a user equipment (UE) in a time division duplexing mode in accordance with the slot format.

Aspect 2: The method of Aspect 1, wherein a maximum number of slots in a slot configuration list of the information element includes a threshold quantity of slots associated with a set of periodicities of the plurality of slot formats.

Aspect 3: The method of any of Aspects 1 to 2, wherein the information element is an Xn-application protocol (AP) or F1-AP information element.

Aspect 4: The method of any of Aspects 1 to 3, wherein the information element is a radio resource control information element.

Aspect 5: The method of any of Aspects 1 to 4, wherein the slot format is indicated, in the information element, at a node level or a cell level.

Aspect 6: The method of any of Aspects 1 to 5, wherein the information element is included in at least one of a configuration update message, a configuration update acknowledgement message, a setup request message, or a setup response message.

Aspect 7: A method of wireless communication performed by a user equipment (UE), comprising: receiving an information element that includes a half-slot or full-slot slot-type to identify a slot format, of a plurality of slot formats for supporting time division duplexing, for use during time division duplexing; selecting the slot format for use during time division duplexing based at least in part on whether the information element includes the half-slot or full-slot slot-type to identify the slot format; and communicating with a base station (BS) in a time division duplexing mode in accordance with the slot format.

Aspect 8: The method of Aspect 7, further comprising: determining the information element includes the half-slot or full-slot slot-type to identify the slot format based at least in part on at least one of a length of, or indicated by, a slot configuration list of the information element, a subcarrier spacing, or a transmission periodicity.

Aspect 9: The method of any of Aspects 7 to 8, wherein a maximum number of slots in a slot configuration list of the information element includes a threshold quantity of slots associated with a set of periodicities of the plurality of slot formats.

Aspect 10: The method of any of Aspects 7 to 9, wherein the information element is an Xn-application protocol (AP) or F1-AP information element.

Aspect 11: The method of any of Aspects 7 to 10, wherein the information element is a radio resource control information element.

Aspect 12: The method of any of Aspects 7 to 11, wherein the slot format is indicated, in the information element, at a node level or a cell level.

Aspect 13: The method of any of Aspects 7 to 12, wherein the information element is included in at least one of a configuration update message, a configuration update acknowledgement message, a setup request message, or a setup response message.

Aspect 14: A method of wireless communication performed by a base station (BS), comprising: transmitting an information element identifying a slot format pattern for use during time division duplexing, wherein a length of, or indicated by, a parameter of the information element satisfies a threshold that is based at least in part on a periodicity of the slot format pattern; and communicating with a user equipment (UE) in a time division duplexing (TDD) mode in accordance with the slot format pattern.

Aspect 15: The method of Aspect 14, wherein the periodicity is a 160 millisecond TDD uplink/downlink (UL/DL) periodicity.

Aspect 16: The method of any of Aspects 14 to 15, wherein the length of the parameter or indicated by the parameter is up to 5120.

Aspect 17: The method of any of Aspects 14 to 16, wherein the parameter is a slot configuration list length.

Aspect 18: The method of any of Aspects 14 to 17, wherein the parameter is a maximum number of slots parameter.

Aspect 19: The method of any of Aspects 14 to 18, wherein the information element is an Xn-application protocol (AP) or F1-AP information element.

Aspect 20: The method of any of Aspects 14 to 19, wherein the information element is a radio resource control information element.

Aspect 21: The method of any of Aspects 14 to 20, wherein the slot format pattern is indicated, in the information element, at a node level or a cell level.

Aspect 22: The method of any of Aspects 14 to 21, wherein the information element is included in at least one of a configuration update message, a configuration update acknowledgement message, a setup request message, or a setup response message.

Aspect 23: A method of wireless communication performed by a base station (BS), comprising: receiving an information element identifying a slot format pattern for use during time division duplexing, wherein a length of, or indicated by, a parameter of the information element satisfies a threshold that is based at least in part on a periodicity of the slot format pattern; and communicating with a user equipment (UE) or another BS in a time division duplexing (TDD) mode in accordance with the slot format pattern.

Aspect 24: The method of Aspect 23, wherein the periodicity is a 160 ms TDD uplink/downlink (UL/DL) periodicity.

Aspect 25: The method of any of Aspects 23 to 24, wherein the length of the parameter or indicated by the parameter is up to 5120.

Aspect 26: The method of any of Aspects 23 to 25, wherein the parameter is a slot configuration list length.

Aspect 27: The method of any of Aspects 23 to 26, wherein the parameter is a maximum number of slots parameter.

Aspect 28: The method of any of Aspects 23 to 27, wherein the information element is included in at least one of a configuration update message, a configuration update acknowledgement message, a setup request message, or a setup response message.

Aspect 29: The method of any of Aspects 23 to 28, wherein the information element is an Xn-application protocol (AP) or F1-AP information element.

Aspect 30: The method of any of Aspects 23 to 29, wherein the information element is a radio resource control information element.

Aspect 31: An apparatus for wireless communication at a device, comprising a processor; memory coupled with the processor; and instructions stored in the memory and executable by the processor to cause the apparatus to perform the method of one or more of Aspects 1-6.

Aspect 32: A device for wireless communication, comprising a memory and one or more processors coupled to the memory, the memory and the one or more processors configured to perform the method of one or more of Aspects 1-6.

Aspect 33: An apparatus for wireless communication, comprising at least one means for performing the method of one or more of Aspects 1-6.

Aspect 34: A non-transitory computer-readable medium storing code for wireless communication, the code comprising instructions executable by a processor to perform the method of one or more of Aspects 1-6.

Aspect 35: A non-transitory computer-readable medium storing a set of instructions for wireless communication, the set of instructions comprising one or more instructions that, when executed by one or more processors of a device, cause the device to perform the method of one or more of Aspects 1-6.

Aspect 36: An apparatus for wireless communication at a device, comprising a processor; memory coupled with the processor; and instructions stored in the memory and executable by the processor to cause the apparatus to perform the method of one or more of Aspects 8-13.

Aspect 37: A device for wireless communication, comprising a memory and one or more processors coupled to the memory, the memory and the one or more processors configured to perform the method of one or more of Aspects 8-13.

Aspect 38: An apparatus for wireless communication, comprising at least one means for performing the method of one or more of Aspects 8-13.

Aspect 39: A non-transitory computer-readable medium storing code for wireless communication, the code comprising instructions executable by a processor to perform the method of one or more of Aspects 8-13.

Aspect 40: A non-transitory computer-readable medium storing a set of instructions for wireless communication, the set of instructions comprising one or more instructions that, when executed by one or more processors of a device, cause the device to perform the method of one or more of Aspects 8-13.

Aspect 41: An apparatus for wireless communication at a device, comprising a processor; memory coupled with the processor; and instructions stored in the memory and executable by the processor to cause the apparatus to perform the method of one or more of Aspects 14-22.

Aspect 42: A device for wireless communication, comprising a memory and one or more processors coupled to the memory, the memory and the one or more processors configured to perform the method of one or more of Aspects 14-22.

Aspect 43: An apparatus for wireless communication, comprising at least one means for performing the method of one or more of Aspects 14-22.

Aspect 44: A non-transitory computer-readable medium storing code for wireless communication, the code comprising instructions executable by a processor to perform the method of one or more of Aspects 14-22.

Aspect 45: A non-transitory computer-readable medium storing a set of instructions for wireless communication, the set of instructions comprising one or more instructions that, when executed by one or more processors of a device, cause the device to perform the method of one or more of Aspects 14-22.

Aspect 46: An apparatus for wireless communication at a device, comprising a processor; memory coupled with the processor; and instructions stored in the memory and executable by the processor to cause the apparatus to perform the method of one or more of Aspects 23-30.

Aspect 47: A device for wireless communication, comprising a memory and one or more processors coupled to the memory, the memory and the one or more processors configured to perform the method of one or more of Aspects 23-30.

Aspect 48: An apparatus for wireless communication, comprising at least one means for performing the method of one or more of Aspects 23-30.

Aspect 49: A non-transitory computer-readable medium storing code for wireless communication, the code comprising instructions executable by a processor to perform the method of one or more of Aspects 23-30.

Aspect 50: A non-transitory computer-readable medium storing a set of instructions for wireless communication, the set of instructions comprising one or more instructions that, when executed by one or more processors of a device, cause the device to perform the method of one or more of Aspects 23-30.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. Software shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a network entity, comprising:
   selecting, from a plurality of slot formats for supporting time division duplexing, a slot format for use during time division duplexing;
   transmitting an information element that includes a full-slot slot-type to identify the slot format for use during time division duplexing, wherein a length of, or indicated by, a parameter of the information element is up to 5120; and
   communicating with a user equipment (UE) in a time division duplexing mode in accordance with the slot format.

2. The method of claim 1, wherein a maximum number of slots in a slot configuration list of the information element includes a threshold quantity of slots associated with a set of periodicities of the plurality of slot formats.

3. The method of claim 1, wherein the information element is an Xn-application protocol (AP) or F1-AP information element.

4. The method of claim 1, wherein the information element is a radio resource control information element.

5. The method of claim 1, wherein the slot format is indicated, in the information element, at a node level or a cell level.

6. The method of claim 1, wherein the information element is included in at least one of a configuration update message, a configuration update acknowledgement message, a setup request message, or a setup response message.

7. The method of claim 1, wherein the network entity is associated with a plurality of distributed units.

8. A method of wireless communication performed by a user equipment (UE), comprising:
   receiving an information element that includes a full-slot slot-type to identify a slot format, of a plurality of slot formats for supporting time division duplexing, for use during time division duplexing, wherein a length of, or indicated by, a parameter of the information element is up to 5120;
   selecting the slot format for use during time division duplexing based at least in part on whether the information element includes the full-slot slot-type to identify the slot format; and
   communicating with a network entity in a time division duplexing mode in accordance with the slot format.

9. The method of claim 8, further comprising:
   determining the information element includes the full-slot slot-type to identify the slot format based at least in part on at least one of a length of, or indicated by, a slot configuration list of the information element, a subcarrier spacing, or a transmission periodicity.

10. The method of claim 8, wherein a maximum number of slots in a slot configuration list of the information element includes a threshold quantity of slots associated with a set of periodicities of the plurality of slot formats.

11. The method of claim 8, wherein the information element is a radio resource control information element.

12. The method of claim 8, wherein the slot format is indicated, in the information element, at a node level or a cell level.

13. The method of claim 8, wherein the information element is included in at least one of a configuration update message, a configuration update acknowledgement message, a setup request message, or a setup response message.

14. A method of wireless communication performed by a network entity, comprising:
   transmitting an information element identifying a slot format pattern for use during time division duplexing, wherein a length of, or indicated by, a parameter of the information element satisfies a threshold that is based at least in part on a periodicity of the slot format pattern, wherein the length of, or indicated by, the parameter is up to 5120; and
   communicating with a user equipment (UE) in a time division duplexing (TDD) mode in accordance with the slot format pattern.

15. The method of claim 14, wherein the periodicity is a 160 millisecond TDD uplink/downlink (UL/DL) periodicity.

16. The method of claim 14, wherein the parameter is a slot configuration list length.

17. The method of claim 14, wherein the parameter is a maximum number of slots parameter.

18. The method of claim 14, wherein the information element is an Xn-application protocol (AP) or F1-AP information element.

19. The method of claim 14, wherein the information element is a radio resource control information element.

20. The method of claim 14, wherein the slot format pattern is indicated, in the information element, at a node level or a cell level.

21. The method of claim 14, wherein the information element is included in at least one of a configuration update message, a configuration update acknowledgement message, a setup request message, or a setup response message.

22. The method of claim 14, wherein the network entity is associated with a plurality of distributed units.

23. A network entity for wireless communication, comprising:
one or more memories; and
one or more processors coupled to the one or more memories, the one or more memories storing instructions configurable to be executed by the one or more processors to cause the network entity to:
transmit an information element identifying a slot format pattern for use during time division duplexing, wherein a length of, or indicated by, a parameter of the information element satisfies a threshold that is based at least in part on a periodicity of the slot format pattern, wherein the length of, or indicated by, the parameter is up to 5120; and
communicate with a user equipment (UE) in a time division duplexing (TDD) mode in accordance with the slot format pattern.

24. The network entity of claim 23, wherein the periodicity is a 160 millisecond TDD uplink/downlink (UL/DL) periodicity.

25. The network entity of claim 23, wherein the parameter is a slot configuration list length.

26. The network entity of claim 23, wherein the parameter is a maximum number of slots parameter.

27. The network entity of claim 23, wherein the information element is an Xn-application protocol (AP) or F1-AP information element.

28. The network entity of claim 23, wherein the information element is a radio resource control information element.

29. The network entity of claim 23, wherein the slot format pattern is indicated, in the information element, at a node level or a cell level.

30. The network entity of claim 23, wherein the information element is included in at least one of a configuration update message, a configuration update acknowledgement message, a setup request message, or a setup response message.

* * * * *